United States Patent [19]

Glock

[11] Patent Number: 4,475,757
[45] Date of Patent: Oct. 9, 1984

[54] SPADE

[76] Inventor: Gaston Glock, Siebenbürger Str. 16-26, A-1220 Vienna, Austria

[21] Appl. No.: 414,333

[22] PCT Filed: Dec. 9, 1981

[86] PCT No.: PCT/AT81/00030
§ 371 Date: Aug. 6, 1982
§ 102(e) Date: Aug. 6, 1982

[87] PCT Pub. No.: WO82/01975
PCT Pub. Date: Jun. 24, 1982

[30] Foreign Application Priority Data

Dec. 11, 1980 [AT] Austria ............................. 6029/80

[51] Int. Cl.³ ............................................. A01B 1/22
[52] U.S. Cl. .................................... 294/51; 294/53.5; 294/57; 294/59; 403/91; 403/93
[58] Field of Search ................... 294/49, 51, 52, 53.5, 294/57, 59; 403/84, 87, 91, 92, 93, 103, 109, 150, 161, 408, 409, DIG. 7

[56] References Cited

U.S. PATENT DOCUMENTS

| 951,324 | 3/1910 | Mayer | 294/51 |
| 984,778 | 2/1911 | Remisch | 294/51 |
| 1,177,072 | 3/1916 | Warman | 403/109 X |
| 2,833,585 | 5/1958 | Nischan | 294/51 |

FOREIGN PATENT DOCUMENTS

| 308845 | 10/1918 | Fed. Rep. of Germany | 294/51 |
| 739295 | 9/1943 | Fed. Rep. of Germany | . |
| 2242979 | 3/1974 | Fed. Rep. of Germany | 294/53.5 |
| 2903833 | 8/1980 | Fed. Rep. of Germany | . |
| 894104 | 12/1944 | France | . |
| 332112 | 11/1935 | Italy | 294/53.5 |
| 101759 | 3/1916 | United Kingdom | . |
| 825425 | 12/1959 | United Kingdom | 294/53.5 |

Primary Examiner—Johnny D. Cherry
Attorney, Agent, or Firm—Toren, McGeady and Stanger

[57] ABSTRACT

Spade with a blade coupled to a preferably hollow handle by means of a bearing pin so as to be pivotable and lockable in various positions, and a handle which at its end facing the blade has a plurality of surfaces extending parallel to the bearing pin, wherein adjacent surfaces include an obtuse angle with one another, and wherein the bearing pin is constructed as an eccentric, and wherein, by rotating the eccentric by means of an actuating member, such as, arm, rotary disk or the like, fixed to the eccentric, the spade blade can be pressed against one of these surfaces.

14 Claims, 6 Drawing Figures

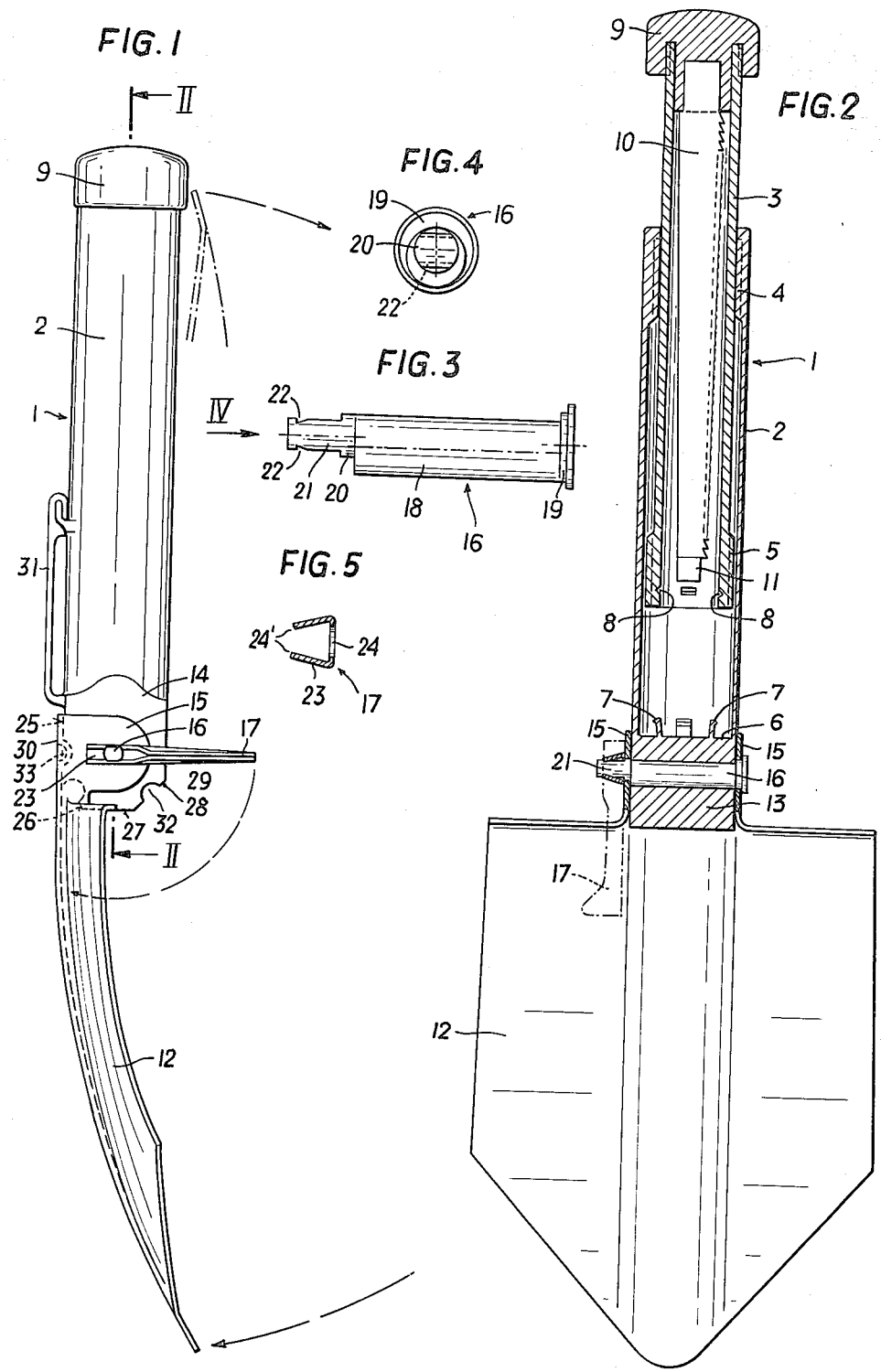

SPADE

BACKGROUND OF THE INVENTION

The invention relates to a spade having a blade which is coupled to a preferably hollow handle by means of a bearing pin so as to be pivotable and rockable in various positions. In the known embodiment of such a spade, a joint is formed by the lower end of the handle, two lugs of the spade blade which are bent upwardly perpendicularly to the spade blade and a bearing pin. The handle carries a nut which is movable relative to the lugs of the spade blade. The lugs have a plurality of surfaces which extend parallel to the bearing pin, wherein adjacent surfaces include an obtuse angle with one another. By loosening the nut it is possible to pivot the blade and tighten it in the desired direction relative to the handle, so that the spade is fixed in the adjusted position. This type of construction has the disadvantage that the thread is exposed, and, therefore, is subjected to damage and dirt, which may impair or eliminate the mobility of the nut. In addition, a high bearing pressure exists between the surfaces on the lugs of the blade and the nut, which very soon results in wear of the spade which render it increasingly useless.

It is the purpose of the invention to provide a spade in which these disadvantages are avoided and which can preferably be folded up to a small volume.

In accordance with the invention, this is achieved thereby that the handle has at its end facing the blade a plurality of surfaces extending parallel to the bearing pin, wherein adjacent surfaces include an obtuse angle with one another and wherein the bearing pin is constructed as an eccentric, and wherein, by rotating the eccentric by means of an actuating element which is fixed to the eccentric, the spade blade can be pressed against one of these plane surfaces at the end of the handle. The invention further relates to advantageous further developments.

BRIEF DESCRIPTION OF THE DRAWING

In the drawing, the subject matter of the invention is illustrated in an embodiment serving as an example.

FIG. 1 is a side view of the spade according to the invention,

FIG. 2 is a cross-sectional view taken along line II—II of FIG. 1,

FIG. 3 is a view of the bearing pin constructed as eccentric,

FIG. 4 is a front view of the bearing pin, and

FIG. 5 is an enlarged cross-sectional view of the approximately U-shaped portion of the actuating arm for the eccentric.

DETAILED DESCRIPTION OF THE INVENTION

Figure 6:
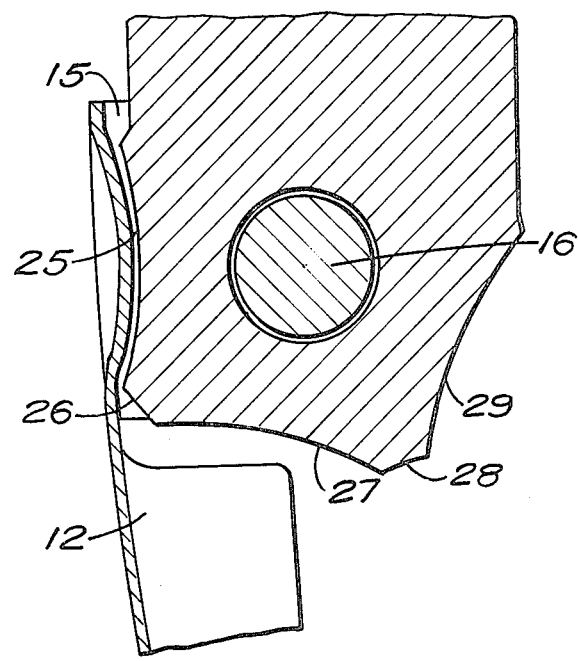
FIG. 6 is an enlarged view of the end of the handle provided with concave surfaces.

The spade handle in its totality denoted by reference numeral 1 is constructed in two pieces and is composed of two telescoped tubes 2, 3, of which the outer spade portion 2 is provided at its free end with an internal thread 4 and the inner spade portion 3 is provided at its inner end with an external thread 5, so that the two handle portions can be screwed together internally by means of threads 4, 5. Internal thread 4 and/or external thread 5 have conical end portions, so that the thread is tightened toward the end of the screwing procedure and an impact on the handle 1 cannot loosen it. For securing the position of the inner handle portion 3 in its retracted position, resilient hooks 7 are provided on the bottom 6 of the outer handle portion 2, the hooks 7 being capable of engagement in recesses 8 of the inner spade portion 3. The tubular, inner spade portion 3 is closed to the outside or, as in the illustrated case, can be closed by means of a screw cap 9 and may serve to receive another tool 10, for example, a saw blade, whose free end is constructed as a screwdriver 11. For the insertion of the handle portion 3, it is necessary to construct the handle portion 2 of a tube into which the bottom 6 is inserted in the manner of a plug. The connection of bottom and tube can be effected by gluing.

The end 13 of the handle connected to the spade blade 12 is laterally provided with plane surfaces 14 which are surrounded by lugs 15 of the blade 12. A bearing pin 16 constructed as eccentric is arranged perpendicularly to these plane surfaces 14. The eccentric protrudes from the bearing on one side and has on this portion a shape which deviates from the circular shape. The actuating arm 17 is seated on this portion.

The bearing pin 16 is supported in the end 13 of the handle 1 by means of its middle portion 18 and has on both sides narrow portions 19, 20 which are also constructed cylindrically, however, the common axis of these portions being offset relative to the axis of the middle portion 18. In order to permit the insertion of the bearing pin from one side, the portion 19 has a greater diameter and the portion 20 has a smaller diameter than the middle portion 18. The small-diameter portion 20 is followed by a portion 21 which projects out of the bearing and, as FIG. 4 shows, has two parallel planes and is provided with grooves 22 in the region of its free end.

The actuating arm 17, which may be replaced by a twist grip, is manufactured from a sheet metal blank and is provided with a portion 23 which is illustrated in FIG. 5 is a cross-sectional view. The opening 24 is adapted to the cross-section of the portion 21 of the bearing pin, so that the actuating arm is secured on the bearing pin for rotation therewith. When the arm 17 is slipped on, the edges 24' engage in the grooves 22. In this manner, special fastening members are avoided.

The end 13 of the handle 1 is provided with plane surfaces 25, 26, 27, 28 and 29 which extend parallel to the bearing pin 16. By means of the bearing pin 16, constructed as eccentric it is possible to pull the region 30 of the blade 12 located between the lugs 15 towards one of these surfaces, so that the spade is fixed in the adjusted position. To avoid damage to the spade, the dimensions can be selected in such a way that the handle 1 is swung when a great torque occurs and reaches engagement with an adjacent surface. If this is to be prevented or made more difficult, grooves 32 can be provided in the surfaces 25–29 and a bead 33 can be provided on the spade blade 12. However, the surfaces 25–29 can also be constructed concave and the spade blade 12 can be constructed convex between the lugs 15.

The handle portion 2 has a length which approximately corresponds to the length of the blade 12. In this manner, the tip of the blade is located approximately in the region of the screw cap 9 when the spade is folded up, as this is illustrated in dash-dot lines in FIG. 1. Further, the handle portion 2 is provided with an eye 31 which permits a detachable fastening of the spade to a belt.

The advantages of the spade according to the invention are apparent. All movable parts are protected against dirt. In the folded up state, the spade requires only little space. The construction of the eccentric and the large-area contact between the spade portion 30 and the surfaces 25 through 29 ensure minimum wear and, therefore, a long service life of the spade. The spade consists of only few parts and is inexpensive to manufacture and simple to handle.

I claim:

1. Spade having a blade coupled to a hollow handle by means of a bearing pin so as to be pivotable and lockable in various positions, characterized in that said handle (1) has at its end (13) facing said blade (12) a plurality of surfaces (25 to 29) extending parallel to said bearing pin (16), wherein adjacent surfaces include an obtuse angle with one another, and wherein said bearing pin is constructed as an eccentric (18, 19, 20), and wherein, by rotating said eccentric by means of an actuating element fixed to said eccentric, said spade blade can be pressed against one of said surfaces.

2. Spade according to claim 1, characterized in that the end (13) of said handle (1) facing said spade blade (12) has lateral, plane surfaces (14) extending perpendicularly to said bearing pin (16), and that said handle end is surrounded by two upwardly bent lugs (15) of said blade.

3. Spade according to claims 1 or 2, characterized in that said surfaces (25–29) extending parallel to said bearing pin (16) are plane.

4. Spade according to claim 2, characterized in that said surfaces (25–29) extending parallel to said bearing pin (16) have grooves (32) extending parallel to said bearing pin (16), a bead (33) extending between said lugs (15) of said spade blade (12) engaging in said grooves (32).

5. Spade according to claim 2, characterized in that said surfaces (25–29) extending parallel to said bearing pin (16) are constructed concave and said spade blade (12) is constructed correspondingly convex between said lugs (15).

6. Spade according to claim 1, characterized in that said handle (1) is composed of telescoped inner and outer portions (2, 3), and the length of the outer handle portion (3) corresponds approximately to the length of said spade blade (12).

7. Spade according to claim 6, characterized in that said outer handle portion (2) carries on the free end an internal thread (4) and said inner, extractible handle portion (3) carries at the inner end an external thread (5), and that said two handle portions (2, 3) can be screwed together internally.

8. Spade according to claim 7, characterized in that said external thread (5) and said internal thread (4) are constructed slightly conically at least in their end regions.

9. Spade according to claim 6, characterized in that said outer handle portion (2) has a bottom (6), said bottom (6) having resilient hooks (7) which detachably engage in recesses (8) of said inner handle portion (3).

10. Spade according to claim 6, characterized in that said inner handle portion (3) is composed of a tube which can be closed at the free end and serves to receive another tool.

11. Spade according to claim 1, characterized in that said spade handle has a carrying eye (31).

12. Spade according to claim 1, characterized in that said bearing pin (16) constructed as an eccentric projects out of the bearing on one side and has a non-circular cross-section in this projecting portion and is provided with at least one circumferential groove (22) into which said actuating element (17) of said eccentric engages with the edges (24') of its approximately U-shaped portion (23).

13. Spade according to claim 1, wherein said actuating element (17) is an arm.

14. Spade according to claim 1, wherein said actuating element (17) is a rotary disk.

* * * * *